April 16, 1935.   F. EMMITE   1,998,002
FRUIT WASHER
Filed Sept. 21, 1933

INVENTOR
Frank Emmite
John A. Naismith
ATTORNEY

Patented Apr. 16, 1935

1,998,002

UNITED STATES PATENT OFFICE 1,998,002

FRUIT WASHER

Frank Emmite, San Jose, Calif.

Application September 21, 1933, Serial No. 690,314

1 Claim. (Cl. 146—194)

The present invention relates particularly to means for washing the lye solution from peaches preparatory to canning.

In the preparation of peaches for canning it is customary to cut them in halves and remove the pit, and then pass them through a lye solution to peel the same. In this peeling process the inner surface of the freshly cut and pitted peach is exposed to the lye solution, and of course some of the solution remains on the fruit when it is removed from the lye bath.

It is the object of the present invention to provide a means for washing the fruit and thoroughly cleansing the same of the lye solution immediately upon its removal from the lye bath.

It is also an object of the invention to provide a means of the character indicated that will be economical to manufacture, simple in form and construction, of few parts, strong, durable, and highly efficient in its practical application.

Figure 1:
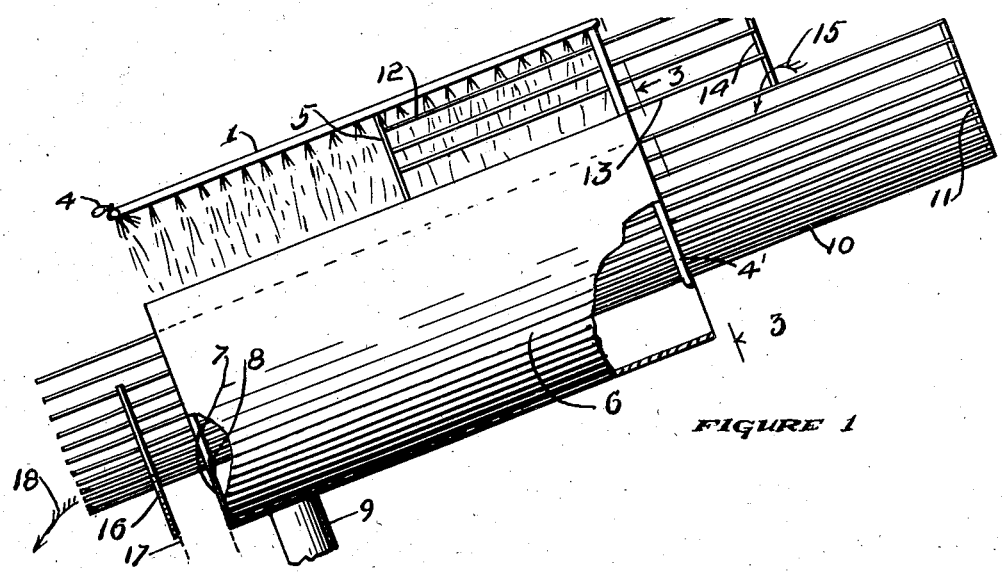
Figure 1 is a side elevation of a device embodying my invention, with parts broken away and partly in section.
Figure 2:
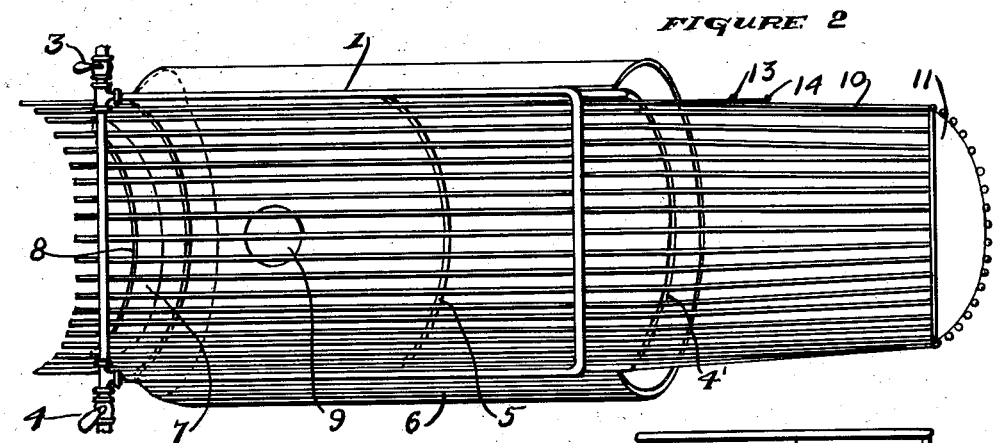
Figure 2 is a plan view of the same.
Figure 4:
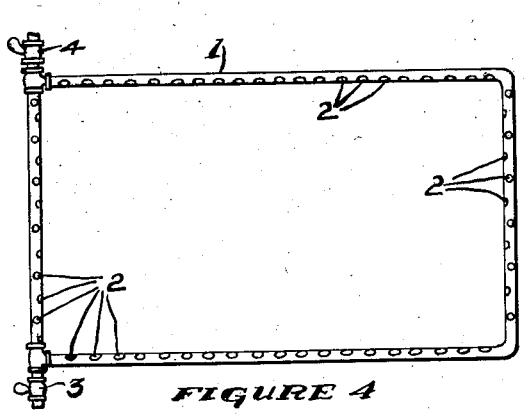
Figure 4 is a bottom plan view of the sprayer.
Figure 3:
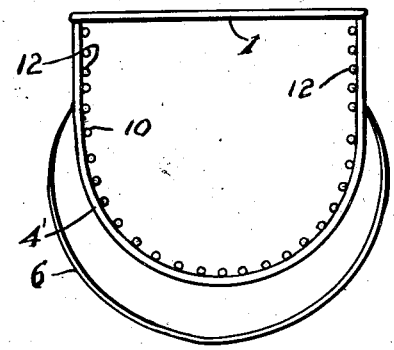
Figure 3 is a view on line 3—3 of Figure 1.

Referring now more particularly to the drawing, I show at 1 a rectangular structure formed of water pipe, this pipe having spaced orifices formed therein along what may be properly termed the under side, as at 2. Water may be introduced into the pipe through valves as 3 and 4, one admitting hot, and the other cold water as desired.

At 4' and 5 are two U shaped wire supporting members mounted upon and depending from the under side of pipe 1, one at the extreme end of the structure 1 and the other midway between the two ends as shown.

At 6 is a trough shaped sheet metal element having its two side edges mounted on the opposing sides of the members 4'—5 to form a unitary part thereof. In the end of this trough remote from the member 4' is inserted a crescent-shaped element 7, the inner edge 8 of which conforms to the curvature of the members 4' and 5. A drain pipe 9 is mounted in the trough 6 adjacent end piece 7.

At 10 is a chute formed of laterally spaced wires mounted upon and attached to members 4' and 5 and edge of 8 of element 7. The end of the chute overlying member 4' extends a distance beyond said member and is provided with an end closure 11, while the other end of the wire chute extends a distance beyond the element 7 to which it is attached, and is left open to permit the free discharge of fruit therefrom.

To prevent fruit from being thrown out of the chute 10 additional wires as 12 are fitted in between members 4' and 5 above the edges of trough 6, these wires being extended beyond the member 4' on one side as at 13, and secured to an upstanding wire 14. This extension provides additional security against fruit being thrown out of the chute when it is turned in as indicated by arrow 15.

A crescent-shaped element 16 is mounted on the under side of the chute 10 in spaced relation to trough 6 and adjacent end 7. This element cooperates with the adjacent end of trough 6 to form a saddle adapted to engage or seat upon the adjacent edge of the tank into which the fruit is discharged, a fragment of which is shown in dotted lines at 17.

When the device is ready for use it is mounted in substantially the position shown, its inclination to the horizontal being such that fruit dumped into the chute 10 at 15 will slide freely, but not too swiftly, down the same and discharge at 18.

While the fruit is flowing down the chute water of the required temperature is admitted to pipe 1 by manipulation of the valves 3—4 and forcibly discharged through orifices 2, spraying the passing fruit with sufficient force and in sufficient quantity to thoroughly cleanse it of the lye solution. This water is caught, after it passes over the fruit and through the chute 10, in the trough 6 and discharged at 9.

It is to be understood, of course, that while I have herein shown and described but one specific embodiment of the invention, changes in form, construction, and method of assembly and operation may be made within the scope of the appended claim.

I claim:

A device for washing halved and peeled fruit comprising, a rectangular structure of pipe having discharge orifices formed therein along its under side, spaced U shaped members mounted thereon and depending therefrom, a trough mounted on the last named members to underlie the same, and a chute formed of laterally spaced wires fixedly mounted on the U shaped members to overlie the trough and extending beyond the same at both ends.

FRANK EMMITE.